United States Patent
Paul

(10) Patent No.: US 7,682,127 B2
(45) Date of Patent: Mar. 23, 2010

(54) DYNAMICALLY SELF-BALANCED FLUID TURBINE

(76) Inventor: Marius Angelo Paul, 1120 E. Elm Ave., Fullerton, CA (US) 92831

(*) Notice: Subject to any disclaimer, the term of this patent is extended or adjusted under 35 U.S.C. 154(b) by 676 days.

(21) Appl. No.: 11/624,124

(22) Filed: Jan. 17, 2007

(65) Prior Publication Data
US 2007/0172346 A1  Jul. 26, 2007

Related U.S. Application Data

(60) Provisional application No. 60/760,232, filed on Jan. 18, 2006.

(51) Int. Cl.
*F03D 3/04* (2006.01)

(52) U.S. Cl. .................. 415/4.2; 415/4.4; 415/60; 415/191; 415/224; 416/120

(58) Field of Classification Search .................. 415/4.2, 415/4.3, 4.4, 4.5, 60, 65, 191, 224, 907; 416/120, 416/121, 122; 290/43, 44, 54, 55
See application file for complete search history.

(56) References Cited

U.S. PATENT DOCUMENTS

| | | | | | |
|---|---|---|---|---|---|
| 4,088,419 | A | * | 5/1978 | Hope et al. | 415/4.4 |
| 4,156,580 | A | * | 5/1979 | Pohl | 415/4.2 |
| 4,174,923 | A | * | 11/1979 | Williamson | 415/211.1 |
| 4,606,697 | A | * | 8/1986 | Appel | 415/4.4 |

* cited by examiner

*Primary Examiner*—Ninh H Nguyen
(74) *Attorney, Agent, or Firm*—Black Lowe & Graham PLLC

(57) ABSTRACT

A system and method for orienting first and second reaction turbines relative to an axis of rotation responds to a fluid flow having a flow orientation axis. The fluid flow is received in a casement. The casement has first and second endplates situated parallel and spaced apart along the axis of rotation. A first half of the fluid flow drives the first reaction turbine to rotate with a first spin orientation in a plane perpendicular to the axis of rotation to produce a first torque about the axis of rotation. The second half of the fluid flow drives the second reaction turbine, offset from the casement plane relative to the first reaction turbine, with a second spin orientation opposite the first spin orientation to produce a second torque about the axis of rotation. The casement is oriented about the axis of rotation in response to the first and second torques.

18 Claims, 3 Drawing Sheets

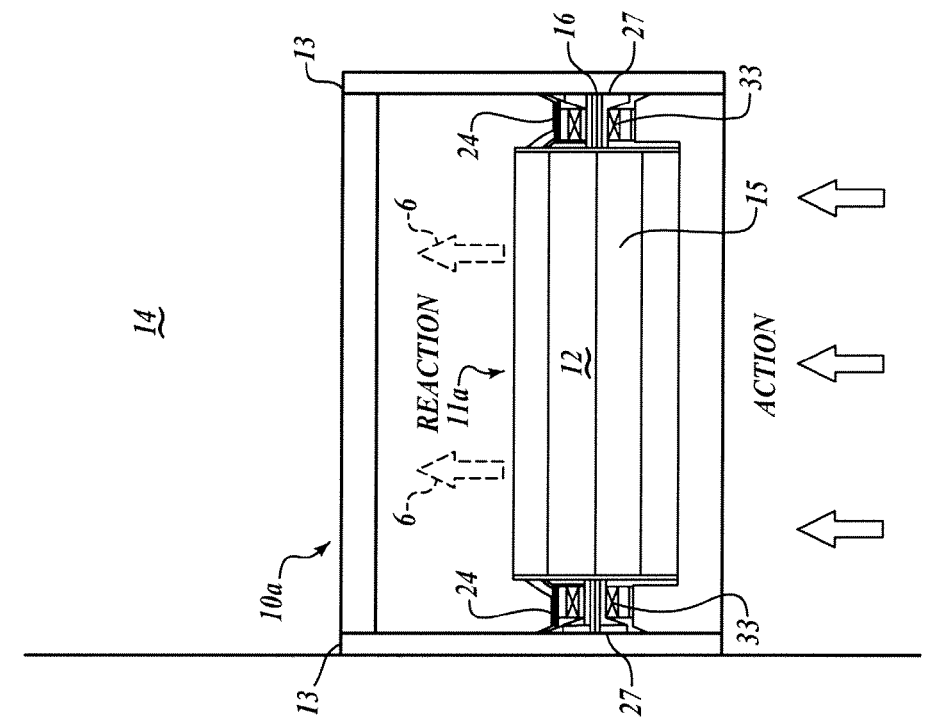
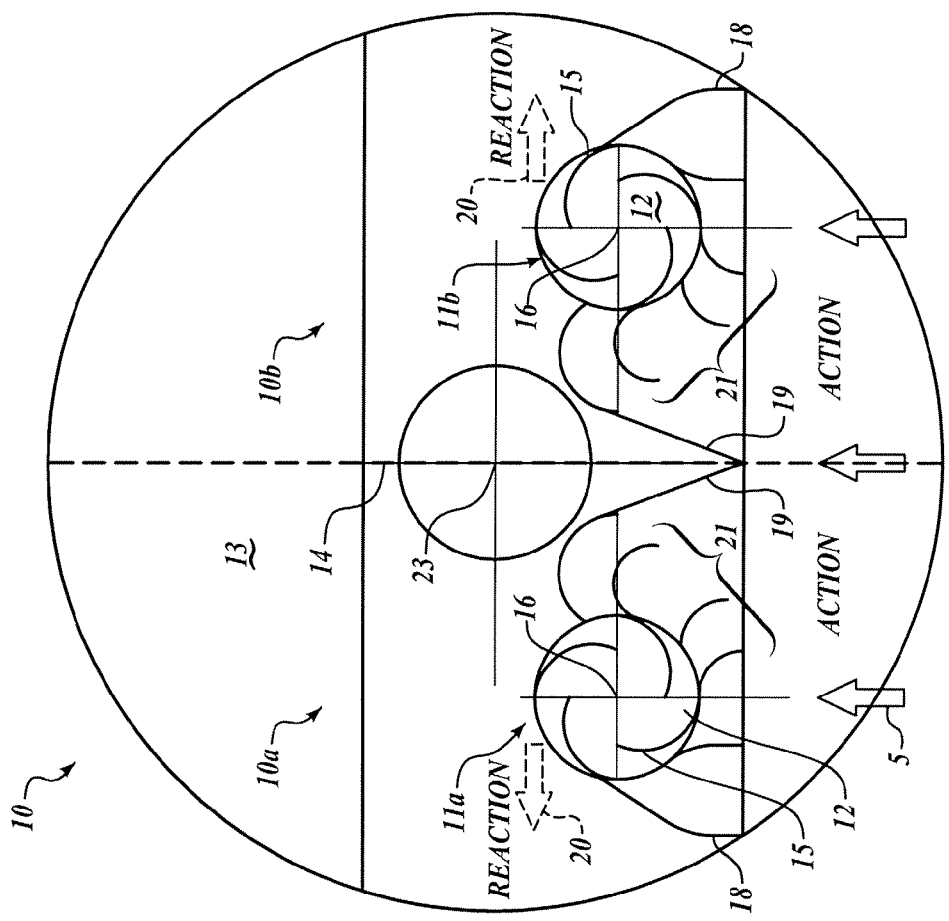
FIG.1B
FIG.1A

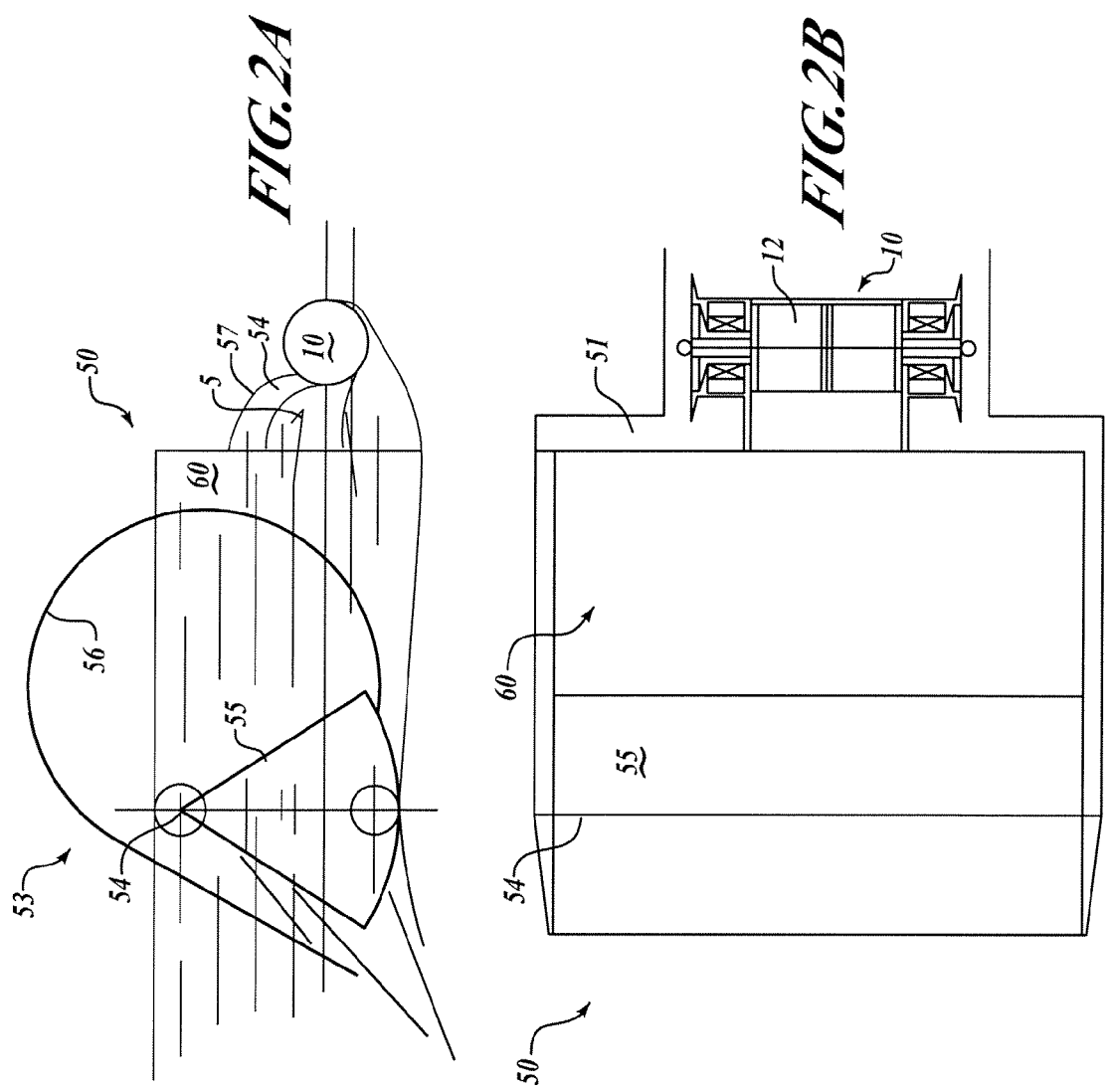

DYNAMICALLY SELF-BALANCED FLUID TURBINE

PRIORITY CLAIM

This Application claims priority from provisional application Ser. No. 60/760,232 with a filing date of Jan. 18, 2006 and having the title, "Universal Fluid Dynamic Power System and Desalination." This reference incorporates that application in its entirety in this application.

FIELD OF THE INVENTION

This invention relates generally to turbine technology and, more specifically, to fluid-driven reaction turbines.

BACKGROUND OF THE INVENTION

The operation of reaction turbines is described by Newton's third law of motion (action and reaction are equal and opposite). In a reaction turbine, unlike in an impulse turbine, the nozzles that discharge the working fluid are attached to the rotor.

The acceleration of the fluid leaving the nozzles produces a reaction force on a turbine rotor, causing the rotor to move in the opposite direction to that of the fluid. The pressure of the fluid changes as it passes through the rotor blades. In most cases, a pressure casement is needed to contain the working fluid as it acts on the turbine; in the case of water turbines, the casement also maintains the suction imparted by the draft tube. Alternatively, where a casement is absent, the turbine must be fully immersed in the fluid flow as in the case of wind turbines.

A reaction turbine is most efficient when suitably oriented to the fluid flow. In the case, for example, of wind turbine applications, the shifting orientation of the driving wind causes fluctuating efficiency in exploiting the wind as an energy source. The most frequent means used to orient the turbines includes some form of vane in the fashion of farmyard windmill. Using a vane, however, has proven to be inefficient and achieves orientation slowly often lagging the actual orientation of the fluid flow.

Actuated orientation of turbine requires the use of rapidly performing processors and suitable sensors. Those algorithms generally use the output of the turbine using a phase-locked loop. Generally, these algorithms suffer from perennial searching loops overshooting the maxima in a manner characteristic of either under- or over-damped oscillatory systems. In either of the vaned or the actuated systems, searching inefficiencies can denigrate performance of reactive turbine as function of the available kinetic energy of the driving fluid.

There is an unmet need in the art for a self-directing turbine system efficiently deriving energy from a flowing fluid stream.

SUMMARY OF THE INVENTION

A system and method for orienting first and second reaction turbines relative to an axis of rotation responds to a fluid flow having a flow orientation axis. The fluid flow is received in a casement. The casement has first and second endplates situated parallel and spaced apart along the axis of rotation. A first half of the fluid flow drives the first reaction turbine to rotate with a first spin orientation in a plane perpendicular to the axis of rotation to produce a first torque about the axis of rotation. The second half of the fluid flow drives the second reaction turbine, offset from the casement plane relative to the first reaction turbine, with a second spin orientation opposite the first spin orientation to produce a second torque about the axis of rotation. The casement is oriented about the axis of rotation in response to the first and second torques.

BRIEF DESCRIPTION OF THE DRAWINGS

Preferred and alternative embodiments of the present invention are described in detail below with reference to the following drawings:

FIG. 1a is a cross-section of the orientable turbine casement;

FIG. 1b is a longitudinal section of a half casement including a single turbine;

FIG. 2a is a cross-section of a fluid catchment system;

FIG. 2b is a plan view of the fluid catchment system; and

DETAILED DESCRIPTION OF THE PREFERRED EMBODIMENT

Figure 3:
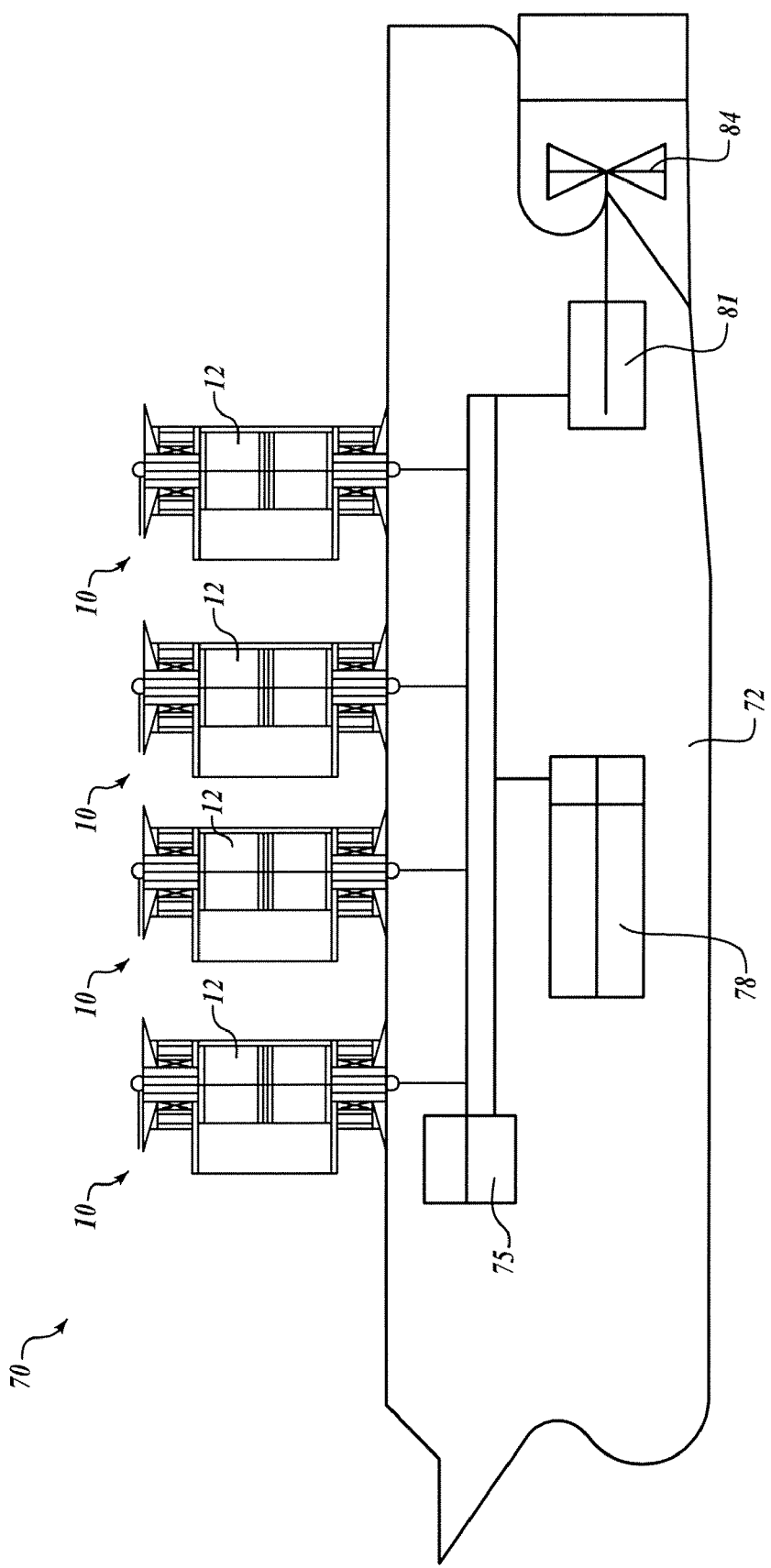
FIG. 3 is a shipboard use of the orientable turbine casement used to provide motive force in a ship.

A self-orienting casement pressure casement comprises a first and a second turbine spinning in opposite directions to produce generally balanced and opposing torques about an orientation axis. As a flow of fluid along a fluid flow vector drives the first and second turbines, imbalances occur between the loading of the first and second turbine. Generally these imbalances are the result of the orientation of the casement deviating from the orientation of the fluid flow vector. The resulting differences in torque between the first and the second turbines tends to reorient the casement to align with the fluid flow vector resulting in stable equilibrium as the imparted torque from the first and second turbines balance each other.

Referring to FIG. 1a, a cross-section of the orientable turbine casement 10, the symmetry of the elements of the orientable turbine casement 10 about a casement plane 14, is evident. The casement plane 14 is set forth to define a plane of symmetry and by design conveniently indicates the orientation of the casement 10 relative to an optimum orientation relative to the fluid flow vector 5. The fluid flow vector 5 may represent either the flow of a compressible or noncompressible fluid such that the embodiment will function in air, water, seawater, and any other fluid. The casement 10 does not depend for its performance upon any inherent properties of either liquids or gasses.

An orientation axis 23 is contained in the casement plane 14 and passes through an endplate 13 at a point; the orientation axis 23 is generally perpendicular to the generally planar endplate 13. The endplate 13 is shown in non-limiting exemplary form as circular but the shape of the endplate 13 is not a necessary feature. A round endplate 13 is shown to emphasize, in this exemplary embodiment, that the endplate 13 is configured to rotate about the orientation axis 23 in order to align the casement plane 14 with the fluid flow vector 5 as shown.

Suitably mounted on the endplate 13 to further form the casement 10 are casement outer walls 18 and casement inner walls 19 which, in concert with the endplates 13 in this exemplary non-limiting embodiment of the orientable casement 10, form flow concentrators bilaterally symmetrically about the casement plane 14. The casement plane 14 bisects the orientable casement 10 into a first casement half 10a having a first turbine system 11a and its mirror image, the second casement half 10b having a second turbine system 11b. In the exemplary embodiment, the first casement half 10a is a precise mirror image of the second casement half 10b, however, it is envisioned and suitably included in this disclosure that where, by virtue of a selected application, orienting the orientation axis horizontally in a fluid, differences in density of the fluid at the locations of the first and second turbine systems, 11a and 11b, might result in measurable differences in the performance between the first and second turbine systems 11a, 11b, in a fashion that slight differences in the dimensional geometry are necessary to balance the output of the first and second turbine systems. For this reason, first and second turbine systems 11a, 11b are substantially mirror images of each other, though not necessarily precise mirror images.

For purposes of this disclosure, the mirrored nature of the first turbine system 11a to the second turbine system 11b, thereby necessitating only that the first turbine system 11a be fully disclosed to fully disclose the second turbine system 11b. The first turbine system 11a does, by virtue of its mirror-image-ness rotates in the opposite direction to the second turbine system 11b. The turbine rotor 12 of the first turbine system 11a mirrors the turbine rotor 12 of second turbine systems 11b to such an extent that the turbine blades 15 of the first turbine system 11a impart a rotation to the rotor 12 that is opposite in orientation to that imparted by the turbine blades 15 to the rotor 12 in the second turbine system 11b.

Concentrating on the first turbine system 11a, the rotor 12 is a reaction rotor. As noted in the background, in a reaction turbine such as the first turbine system 11a, acceleration of the fluid leaving the turbine blades 15 produces a reaction force on a turbine rotor 12, causing the rotor 12 to move in the opposite direction to that of the fluid.

In the first turbine system 11a fluid enters the system with kinetic energy directed along the fluid flow vector 5. An outer casement wall 18, an inner casement wall 19, and a plurality of pre-whirl vanes direct the fluid flow onto the rotor 12 at the rotor blades 15 causing the rotor 12 to rotate. Secondarily, the rotation of the rotor 12 in the fluid imparts a torque 20 tending to cause rotation about the orientation axis 23. Because the torques 20 generated by each of the first turbine system 11a and the second turbine system 11b tend to be in balance there is no resultant movement about the orientation axis and the casement 10 remains oriented by balance of the torques 20. Due to the geometric relationship of the first and second torques 20, the casement 10 rotates about the orientation axis 23 seeking to balance the torques 20. The casement 10 tends to reorient in the direction of the greater torque exposing to a greater extent the lesser, in terms of volume flowing over the rotors 12, of the first turbine system 11a or the second turbine system 11b. By such means, the casement 10 tends to self orient to balance the performance of the first turbine system 11a and the second turbine system 11b, thereby orienting the casement plane 14 to the fluid flow vector 5.

Referring to FIG. 1b, a longitudinal section of first half casement 10a including the first turbine system 11a, excludes (for purposes of clarity) the outer casement wall 18 (FIG. 1a), the inner casement wall 19 (FIG. 1a), and the pre-whirl vanes 21 (FIG. 1a). The rotor 12 has rotor blades 15 that extend longitudinally substantially from the first endplate 13 to the second endplate 13. The casement 10a is oriented to receive the fluid flow (indicated by fluid flow vectors 5) in parallel to the casement plane 14. The escaping fluid is shown by fluid escape vectors 6 leaving the rotor 12.

In this exemplary embodiment, turbine pivots 24 are situated and connect the endplates 13 by virtue of the pivot stators 27 and to the rotor 12 allowing the rotor 12 to rotate relative to the pivot stators 27 about the axis of rotation 16 in response to the fluid flow along the fluid flow vectors 5. Rotation of the rotor 12 relative to the pivot stators 27 generates electricity by virtue of generator elements 33 attached to the rotor 12 rotating about the stator 27. While not shown, the casement half 10a including the endplates 13 are free to orient relative to the fluid flow 5 about the orientation axis 23 to maintain optimal orientation of the casement 10.

Referring to FIG. 2a, a cross-section of a fluid catchment system demonstrates a non-limiting embodiment in a water turbine application. Tidal-power is the power achieved by capturing the energy contained in moving water mass due to tides. The orientable turbine casement 10 may be used in either of a riverine or a tidal application, though the tidal application is the more elaborate and therefore the subject of this disclosure. The riverine application differs only in that no barrage 56 need be present. For this reason, the fluid catchment system 50 described here includes the barrage 56.

The barrage 56 is an artificial obstruction similar to a dam. The barrage 56 is hollow to enclose a flapper valve 55 on a valve pivot 54. The barrage 56 is rounded to allow smooth overflow of the barrage 56 by a flooding tide at high tide. Where the height of the tide is less than that of high tide, the flapper valve 56 works to ratchet the flow of water 60 into the catchment system 50. With each wave, the kinetic energy of each wave urges the flapper valve 55 into its open position. As the wave recedes, the head created by the standing water 60 urges the flapper valve 55 into sealing engagement against the barrage 56.

The same head of the standing water 60 is converted into kinetic energy as the water flows through the funnel concentrator 57 according to the fluid flow vector 5. The orientable turbine casement 10 orients itself according to the method set forth in the discussion above. As the water 60 flow through the orientable turbine casement 10, the level of the water 60 drops resulting in a variable fluid flow vector 5. Thus, the orientable turbine casement 10 assures the most efficient exploitation of the head created by the standing water 60.

Referring to FIG. 2b, a plan view of the fluid catchment system, shows an alternate embodiment of the invention suitable for exploiting both tidal action and the self-orienting ability of the orientable turbine casement 10. A channel is defined between a tidal basin (not shown) and an ocean inlet (not shown). Absent the catchment system 50, water 60 carried on the inrushing tide flows through the channel to fill the tidal basin. As the tide recedes, water in the tidal basin flows in the reverse direction out of the tidal basin.

Interposing the orientable turbine casement 10 exploits the flow from through the channel to fill the tidal basin and from the tidal basin back out to the ocean. In this exemplary embodiment, a funnel is defined by a seawall 51 having the flapper valve 55 to modulate the effects of wave action within the catchment system 50 thereby assuring less variation in depth of the collected water 60. With an onrushing tide, the water 60 is elevated above the level of water in the tidal pool. The rotors 12 of the orientable casement 10 are driven by the head the water 60 provides. By action of the rotors 12, the orientable casement 10 orients itself to exploit the onrushing tide to generate power.

As the tide recedes, water trapped in the tidal pool rushes through the casement system 50. Water flowing from the tidal pool to the lower level of water 60 within the seawall 51 drives the rotors 12. By action of the rotors 12, the orientable casement 10 reorients to exploit the reversed flow. The head is cyclically created in the fashion to drive the rotors.

FIG. 3 is a shipboard use of the orientable turbine casement 10 used to provide motive force in a ship. A ship's hull 72 is driven through the water by generating electricity with the orientable casement 10 in multiple vertical masts. The lateral stability of the hull 72 allows the use of the orientable casement 10 both to provide a sail-like propulsion of the hull and by the further action of the rotors 12 to generate electricity.

As the rotors 12 spin and orient the orientable turbine casement 10 according to the wind direction relative to the hull 72. While an auxiliary power unit 75 is also available to supply electricity in low-wind conditions, generally the spinning rotors 12 generate the power necessary to power the systems within the hull 72 through the power control panel 78. As directed from the panel 78, electricity is routed an electric motor 81 used to rotate a screw 84 providing propulsion to the hull 72.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A reaction turbine system comprising:
   a casement being bilaterally symmetrically arranged about a casement plane containing an orientation axis extending substantially from a first endplate to a second endplate, the first and second endplates being parallel and spaced apart relative to orientation axis;
   a first reaction turbine offset from the casement plane and configured to receive fluid flow from the casement to drive a first reaction turbine rotor rotating with a first spin orientation in a plane perpendicular to an orientation axis producing a first torque about the orientation axis;
   a second reaction turbine symmetrically offset from the casement plane relative to the first reaction turbine and configured to receive fluid flow from the casement to drive a second reaction turbine rotor rotating in a second spin orientation opposite the first spin orientation producing a second torque about the orientation axis; and
   a first casement pivot attached at the first endplate allowing the casement to rotate relative to the first casement pivot about the orientation axis in response to the first and second torques.

2. The turbine system of claim 1, further comprising:
   a second casement pivot attached at the second endplate allowing the casement to rotate relative to the second casement pivot about the orientation axis in response to the first and second torques in conjunction with the first pivot.

3. The turbine system of claim 1, wherein the casement includes:
   a first plurality of pre-whirl vanes oriented to drive the first reaction turbine; and
   a second plurality of pre-whirl vanes oriented symmetrically to the first plurality of pre-whirl vanes to drive the second reaction turbine.

4. The turbine system of claim 1, wherein:
   the first turbine system includes at least one first turbine pivot fixing the position of the first reaction turbine rotor relative to the casement while allowing the first reaction turbine rotor to spin in the first spin orientation; and
   the second turbine system includes at least one second turbine pivot fixing the position of the second reaction turbine rotor relative to the casement while allowing the second reaction turbine rotor to spin in the first spin orientation.

5. The turbine system of claim 4, wherein each of the first and second turbine pivots include a pivot stator base and generator elements to generate electricity upon rotation of the reaction turbine rotor relative to the pivot stator base.

6. The turbine system of claim 1, wherein the fluid flow is flow of water.

7. The turbine system of claim 6, wherein the casement is configured to exploit natural movement of water in one of a group consisting of an ocean inlet, a tidal pool, or a river.

8. The turbine system of claim 1, wherein the fluid flow is flow of wind.

9. The turbine system of claim 8, wherein the turbine system is configured to drive a hull through the water.

10. A method for orienting a reaction turbine system relative to an orientation axis in response to a fluid flow along a flow vector, the method comprising:
    receiving the fluid flow in a casement generally symmetrically situated relative to a casement plane containing the orientation axis and having first and second endplates situated parallel and spaced apart along an axis of rotation;
    driving a first reaction turbine with a first half of the fluid flow the first reaction turbine driving a first reaction turbine rotor with a first spin orientation in a plane perpendicular to the axis of rotation producing a first torque about the orientation axis;
    driving a second reaction turbine with a second half of the fluid flow, the second reaction turbine being offset from the casement plane relative to the first reaction turbine, driving a second reaction turbine rotor with a second spin orientation opposite the first spin orientation producing a second torque about the orientation axis; and
    orienting the casement about the orientation axis in response to the first and second torques.

11. The method of claim 10, wherein the orienting the casement includes rotating the casement on at least one pivot axis situated coaxially with the axis of orientation.

12. The method of claim 10, wherein the receiving the fluid flow in a casement includes receiving the fluid flow at a plurality of pre-whirl vanes oriented to drive each of the first and the second reaction turbine rotors.

13. The method of claim 10, wherein:
    driving the first reaction turbine rotor includes driving the first reaction turbine rotor to rotate on a first turbine pivot; and
    driving a second reaction turbine rotor includes driving the second reaction turbine rotor to rotate on a second turbine pivot.

14. The method of claim 13, wherein the driving each of the first and the second reaction turbine rotors includes rotating the reaction turbine rotors relative to first and second pivot stator bases respectively.

15. The method of claim 10, wherein the driving each of the first and the second reaction turbine rotors with a fluid flow includes driving each of the first and the second reaction turbine rotors with a water flow.

16. The method of claim 15, wherein the fluid flow includes natural movement of water in one of a group consisting of an ocean inlet, a tidal pool, or a river.

17. The method of claim 10, wherein the driving each of the first and the second reaction turbine rotors with a fluid flow includes driving each of the first and the second reaction turbine rotors with a flow of wind.

18. The method of claim 17, wherein the driving each of the first and the second reaction turbine rotors with a flow of wind includes driving a hull through water.

* * * * *